US011961430B2

(12) United States Patent
Hatakeyama

(10) Patent No.: US 11,961,430 B2
(45) Date of Patent: Apr. 16, 2024

(54) DISPLAY DEVICE FOR VEHICLE

(71) Applicant: YAZAKI CORPORATION, Tokyo (JP)

(72) Inventor: Masaya Hatakeyama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/452,507

(22) Filed: Aug. 18, 2023

(65) Prior Publication Data
US 2024/0071269 A1    Feb. 29, 2024

(30) Foreign Application Priority Data

Aug. 25, 2022   (JP) ................................. 2022-133869

(51) Int. Cl.
| G09G 3/00 | (2006.01) |
| G02B 27/00 | (2006.01) |
| G06F 3/01 | (2006.01) |
| G06T 7/20 | (2017.01) |
| G06T 7/62 | (2017.01) |
| G06T 7/73 | (2017.01) |

(52) U.S. Cl.
CPC ......... *G09G 3/002* (2013.01); *G02B 27/0093* (2013.01); *G06F 3/013* (2013.01); *G06T 7/20* (2013.01); *G06T 7/62* (2017.01); *G06T 7/73* (2017.01); *G06T 2207/30201* (2013.01); *G06T 2207/30268* (2013.01); *G09G 2320/0626* (2013.01); *G09G 2354/00* (2013.01); *G09G 2360/144* (2013.01); *G09G 2380/10* (2013.01)

(58) Field of Classification Search
CPC .... G06F 3/013; G02B 27/0093; G09G 3/002; G09G 2360/144; G06T 2207/30268
See application file for complete search history.

(56) References Cited

U.S. PATENT DOCUMENTS

| 2019/0259279 A1* | 8/2019 | Narumi ..................... B60R 1/06 |
| 2021/0271319 A1* | 9/2021 | Lussier ................ A61B 3/0041 |
| 2022/0066221 A1* | 3/2022 | Yoon ....................... G06F 3/017 |

FOREIGN PATENT DOCUMENTS

JP           2019-28640 A        2/2019

* cited by examiner

*Primary Examiner* — Robin J Mishler
(74) *Attorney, Agent, or Firm* — KENEALY VAIDYA LLP

(57) ABSTRACT

A display device for a vehicle includes a moving speed calculation unit that calculates a moving speed of a pupil based on a position of the pupil detected by a pupil detection unit. In a case in which the moving speed of the pupil is equal to or lower than a threshold, a pupil diameter calculation unit calculates a pupil diameter at a present time based on the pupil at the present time, and outputs the calculated pupil diameter at the present time to a brightness adjustment unit. On the other hand, in a case in which the moving speed of the pupil exceeds the threshold, the pupil diameter calculation unit outputs a pupil diameter calculated at a previous time to the brightness adjustment unit as the pupil diameter at the present time.

2 Claims, 3 Drawing Sheets

DISPLAY DEVICE FOR VEHICLE

CROSS-REFERENCE TO RELATED APPLICATION(S)

The present application claims priority to and incorporates by reference the entire contents of Japanese Patent Application No. 2022-133869 filed in Japan on Aug. 25, 2022.

BACKGROUND OF THE INVENTION

1. Field of the Invention

The present invention relates to a display device for a vehicle.

2. Description of the Related Art

In some head-up display (HUD) devices mounted on a vehicle such as an automobile, brightness of a virtual image is adjusted by using an illuminance sensor and a pupil diameter of a pupil of a driver, for example, because sensitivity to the brightness of the virtual image displayed in front of the driver varies between individuals.

As a method for detecting a pupil position of the driver, there is known a method for specifying a pupil position based on a difference image between a bright pupil image and a dark pupil image (for example, refer to Japanese Patent Application Laid-open No. 2019-28640).

When the driver vibrates due to traveling of a vehicle on a rough road, there is the possibility that the pupil of the driver cannot be correctly detected, and the brightness of the virtual image is difficult to be adjusted with high accuracy using a pupil diameter, so that there is room for improvement in this point.

SUMMARY OF THE INVENTION

The present invention aims at providing a display device for a vehicle that can adjust the brightness of the virtual image to be displayed with high accuracy.

To achieve the object of the present invention, a display device for a vehicle according to one aspect of the present invention includes an image display unit that projects a display image on a projected member of a vehicle, and causes a driver of the vehicle to visually recognize a virtual image corresponding to the display image projected on the projected member; an imaging unit that acquires a face image including a face of the driver; a pupil detection unit that detects a pupil of the driver based on the face image acquired by the imaging unit; a moving speed calculation unit that calculates a moving speed of the pupil based on a position of the pupil detected by the pupil detection unit; a pupil diameter calculation unit that calculates a pupil diameter of the pupil based on the pupil detected by the pupil detection unit; and an adjustment unit that adjusts brightness of the virtual image based on at least the pupil diameter, wherein the pupil diameter calculation unit outputs the pupil diameter to the adjustment unit based on a comparison result between the moving speed calculated by the moving speed calculation unit and a threshold, calculates the pupil diameter at a present time based on the pupil at the present time detected by the pupil detection unit in a case in which the moving speed is equal to or lower than the threshold, and outputs the calculated pupil diameter at the present time to the adjustment units, and outputs the pupil diameter calculated at a previous time to the adjustment unit as the pupil diameter at the present time in a case in which the moving speed exceeds the threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a display device for a vehicle according to the present invention in detail with reference to the drawings. The present invention is not limited to the embodiment described below. That is, constituent elements in the following embodiment encompass a constituent element that is easily conceivable by those skilled in the art, or substantially the same constituent element, and can be variously omitted, replaced, and modified without departing from the gist of the invention.

EMBODIMENT

Figure 1:
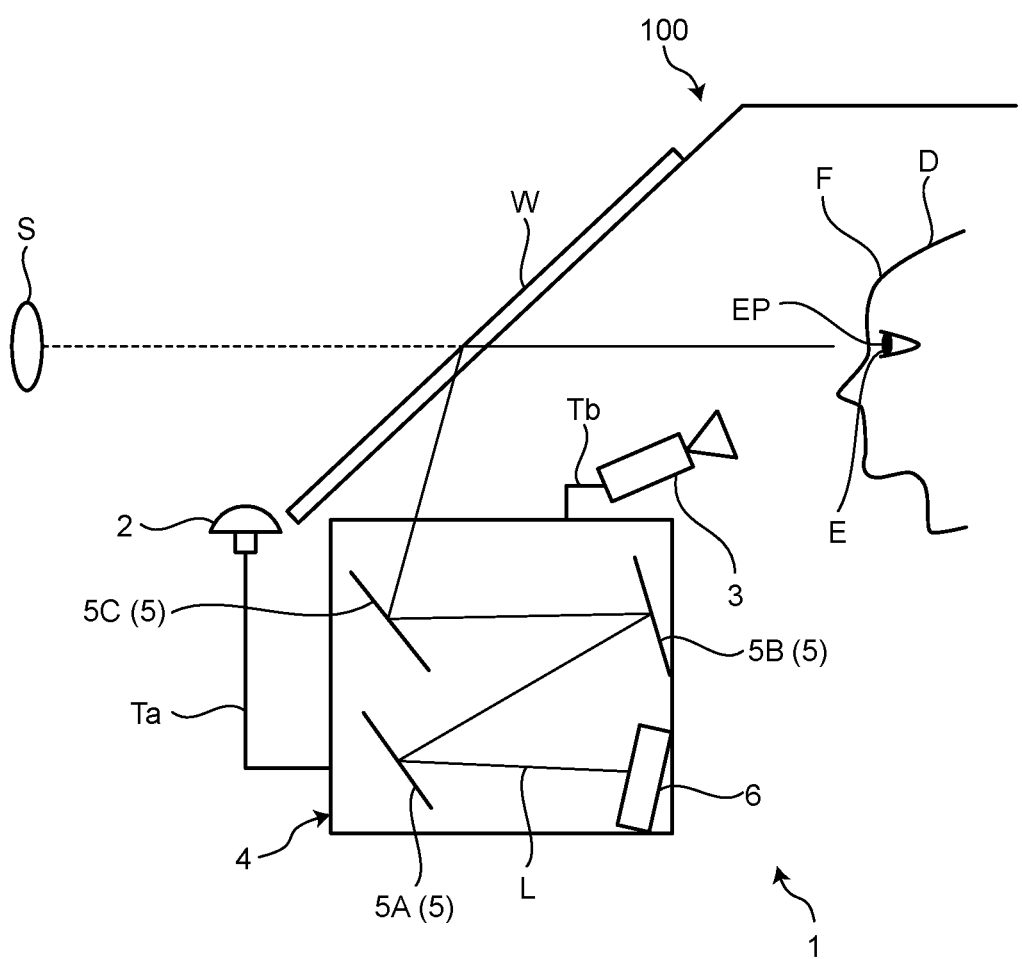
FIG. 1 is a schematic diagram illustrating a schematic configuration of a display device for a vehicle according to an embodiment.

As illustrated in FIG. 1, for example, a display device 1 for a vehicle according to the present embodiment is a head up display (HUD) mounted on a vehicle 100 such as an automobile. The display device 1 for a vehicle projects a display image displayed on a display device 6 on a windshield W as a projected member via a reflective mirror 5 to cause a driver D of the vehicle 100 to visually recognize the display image as a virtual image S. The display device 1 for a vehicle can display the virtual image S to be superimposed on a vehicle, a pedestrian, traffic lights, a sign, a lane, and the like in a real scene in front of the driver D, for example. The display device 1 for a vehicle is, for example, disposed on an inner side of an instrument panel (not illustrated) inside a compartment.

The windshield W has a semi-transmissive property of reflecting part of incident light and transmit the other part thereof, so that the windshield W reflects a display image projected from the display device 1 for a vehicle toward an eye-point EP of the driver D as display light L while transmitting a foreground of the vehicle. The eye-point EP is assumed in advance as a viewpoint position of the driver D. The driver D recognizes the display image reflected by the windshield W as the virtual image S. The virtual image S is recognized by the driver D to be in front of the windshield W.

The display device 1 for a vehicle includes an illuminance sensor 2, a camera 3 for a driver, a housing 4, the display device 6, and three reflective mirrors 5A to 5C.

The illuminance sensor 2 is an example of an illuminance detection unit, and detects illuminance of the vehicle 100.

The illuminance sensor 2 is attached to a back side and the like of a room mirror (not illustrated) or an instrument panel inside the compartment, for example, and detects illuminance of the front side of the vehicle, for example, the front side of the driver D. The illuminance sensor 2 is connected to the display device 6 housed in the housing 4 via a signal line Ta, for example. The illuminance sensor 2 outputs the illuminance detected by the illuminance sensor 2 to the display device 6 via the signal line Ta.

The camera 3 for a driver is an example of an imaging unit in which a camera lens (not illustrated) is disposed to face the driver D to continuously acquire face images including a face F of the driver D. The camera 3 for a driver is disposed, for example, at an upper part of a steering column (not illustrated) in the compartment, and in the rear of a steering wheel (not illustrated) when viewed from the driver D. The camera 3 for a driver can image the face F of the driver D as a moving image, for example, and acquire a static image (frame image) obtained from the taken moving image as a face image. The camera 3 for a driver is connected to the display device 6 via a signal line Tb, for example. The camera 3 for a driver outputs the acquired face image to the display device 6 via the signal line Tb.

The camera 3 for a driver includes a light source (not illustrated), for example. The light source is, for example, a light emitting diode (LED) that emits near infrared light toward the driver D. The light source is turned on (emits infrared light) in accordance with a turn-on signal input from a controller (not illustrated), and turned off in accordance with a turn-off signal. The camera 3 for a driver receives reflected light of light emitted to the face F of the driver D by the light source to take a face image of the driver D. The camera 3 for a driver is started when an accessory (ACC) power source or an ignition (IG) power source of the vehicle 100 is turned on, and continuously takes the face image of the driver D until the power source is turned off.

The housing 4 is formed of synthetic resin and the like, for example, and fixed to a vehicle body (not illustrated). As illustrated in FIG. 1, the housing 4 houses and supports the reflective mirrors 5A to 5C and the display device 6 inside.

The reflective mirrors 5A to 5C are disposed on an optical path of the display light L from the display device 6 to the windshield W, and reflect the display light L emitted from the display device 6 toward the windshield W. For example, the reflective mirrors 5A to 5C are configured by a plane mirror, a concave mirror, and the like.

Figure 2:
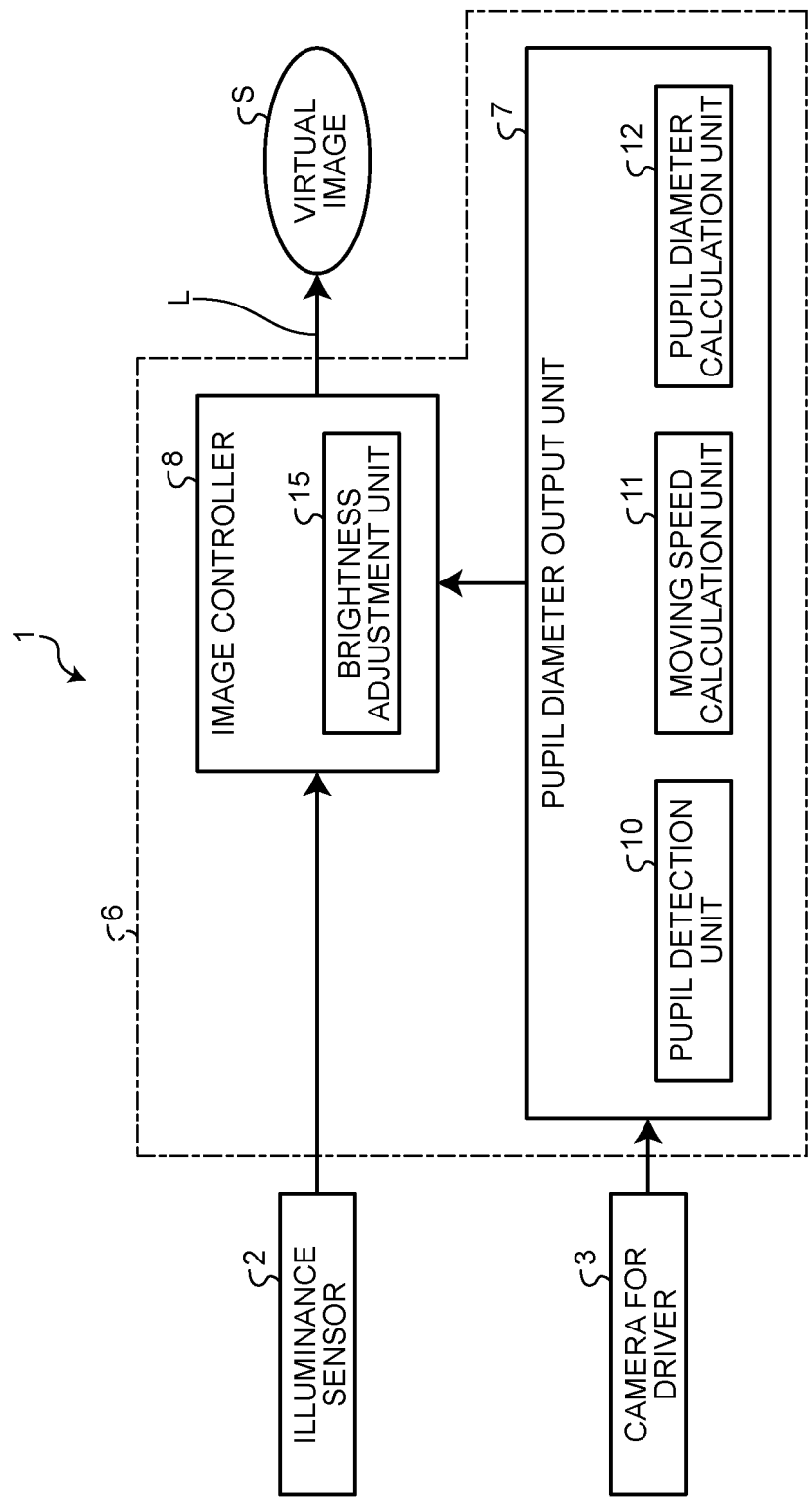
FIG. 2 is a block diagram illustrating a schematic configuration of the display device for a vehicle according to the embodiment.

The display device 6 is an example of an image display unit, and emits, as the display light L, a display image to be visually recognized as the virtual image S by the driver D of the vehicle 100. The display device 6 is, for example, a light transmissive display that transmits light from a back surface side to a front surface side. As the light transmissive display, for example, a thin film transistor (TFT) liquid crystal display is used. The display device 6 according to the present embodiment includes a pupil diameter output unit 7 and an image controller 8 as illustrated in FIG. 2.

The pupil diameter output unit 7 detects a pupil E based on the face image input from the camera 3 for a driver, and calculates a pupil diameter of the detected pupil E to be output to the image controller 8. For example, the pupil diameter output unit 7 also performs rough search for the pupil E of the driver D from the face image of one frame using well-known image processing, and detects a position of the pupil E based on a result thereof. Additionally, the pupil diameter output unit 7 calculates a moving speed M of the pupil E per unit time based on positions of the pupil E in face images of a plurality of frames. Various kinds of processing of the pupil diameter output unit 7 are implemented when a computer (for example, a microcomputer) constituting the display device 1 for a vehicle executes a computer program. The various kinds of processing include well-known image processing, position detection processing for the pupil E, calculation processing for the moving speed M of the pupil E, and the like.

The pupil diameter output unit 7 includes a pupil detection unit 10, a moving speed calculation unit 11, and a pupil diameter calculation unit 12.

The pupil detection unit 10 is an example of a pupil detection unit, and detects the pupil E of the driver D based on the face image acquired by the camera 3 for a driver. For example, the pupil detection unit 10 performs rough search for the pupil E of the driver D from the face image of one frame using well-known image processing, and detects the position of the pupil E based on a result thereof. Examples of the well-known image processing include a Viola-Jones method, a model base method using an eyeball 3D model, a template matching method, a particle method, and the like.

The moving speed calculation unit 11 is an example of a moving speed detection unit, and calculates the moving speed M of the pupil E based on the position of the pupil E detected by the pupil detection unit 10.

The pupil diameter calculation unit 12 is an example of a pupil diameter calculation unit, and calculates a pupil diameter of the pupil E based on the pupil E detected by the pupil detection unit 10. The pupil diameter calculation unit 12 outputs the pupil diameter to a brightness adjustment unit 15 based on a comparison result between a threshold and the moving speed M of the pupil E calculated by the moving speed calculation unit 11.

The threshold is set based on a pupil detection rate (the probability that the position of the pupil E is correctly detected) in a case in which the vehicle 100 travels on a rough road, for example (for example, refer to Japanese Patent Application Laid-open No. 2020-87166). The pupil detection rate is, for example, calculated based on the face images obtained by photographing three subjects at the time when the vehicle 100 travels on a rough road in a photographing environment as described below.

Photographing Environment
Sensor size: VGA (640×480)
Frame rate: 30 [fps] (0.0333 [sec])
Focal length: 6.0 [mm] (horizontal viewing angle: 50°)
Horizontal imaging range: about 740 [mm] (0.74 [m])
Per pixel: 1.156 [mm] (0.001156 [m])

In a case in which the movement amount of the pupil position is 6 pixels per frame, 0.001156×6=0.006937 [m] is established, and the pupil detection rate is lowered. The movement amount of 6 pixels of the pupil position per frame corresponds to the moving speed M of the pupil E=0.006937/0.0333=0.2083 [m/s]. Thus, as a standard for determining whether the pupil detection rate is lowered, the threshold of the moving speed of the pupil E is set to be 0.2 [m/s].

The pupil diameter calculation unit 12 compares the moving speed M of the pupil E calculated by the moving speed calculation unit 11 with the threshold. In a case in which the moving speed M of the pupil E is equal to or lower than the threshold, the pupil diameter calculation unit 12 calculates the pupil diameter at the present time based on the pupil E at the present time detected by the pupil detection unit 10, and outputs the calculated pupil diameter at the present time to the brightness adjustment unit 15. A value of the output pupil diameter is stored at an address of a nonvolatile memory and the like disposed in the pupil diameter output unit 7 together with date and time information.

On the other hand, in a case in which the pupil diameter calculation unit 12 compares the moving speed M of the pupil E calculated by the moving speed calculation unit 11 with the threshold, and the moving speed M of the pupil E exceeds the threshold, the pupil diameter calculation unit 12 outputs the pupil diameter calculated at the previous time as the pupil diameter at the present time to the brightness adjustment unit 15. That is, in a case in which the moving speed M of the pupil E exceeds the threshold as a result of comparison between the moving speed M of the pupil E and the threshold, the pupil diameter output unit 7 reads out the pupil diameter that is calculated at the previous time and stored in the nonvolatile memory by referring to the date and time information, for example, and outputs the pupil diameter to the brightness adjustment unit 15 without causing the pupil diameter calculation unit 12 to calculate the pupil diameter of the pupil E of the driver D.

The image controller 8 performs display control for the display image displayed on the display device 6. The image controller 8 includes the brightness adjustment unit 15.

The brightness adjustment unit 15 adjusts brightness (luminance) of the virtual image S based on a detection result obtained by the illuminance sensor 2 and the pupil diameter of the pupil E of the driver D. In a case in which the pupil diameter of the pupil E of the driver D is fixed, the brightness adjustment unit 15 adjusts the luminance of the virtual image S to be higher when the illuminance detected by the illuminance sensor 2 is high, and adjusts the luminance of the virtual image S to be lower when the illuminance is low. On the other hand, in a case in which the illuminance detected by the illuminance sensor 2 is fixed, the brightness adjustment unit 15 causes the luminance of the virtual image S to be lower when the pupil diameter of the pupil E of the driver D is large, and causes the luminance of the virtual image S to be higher when the pupil diameter is small.

Figure 3:
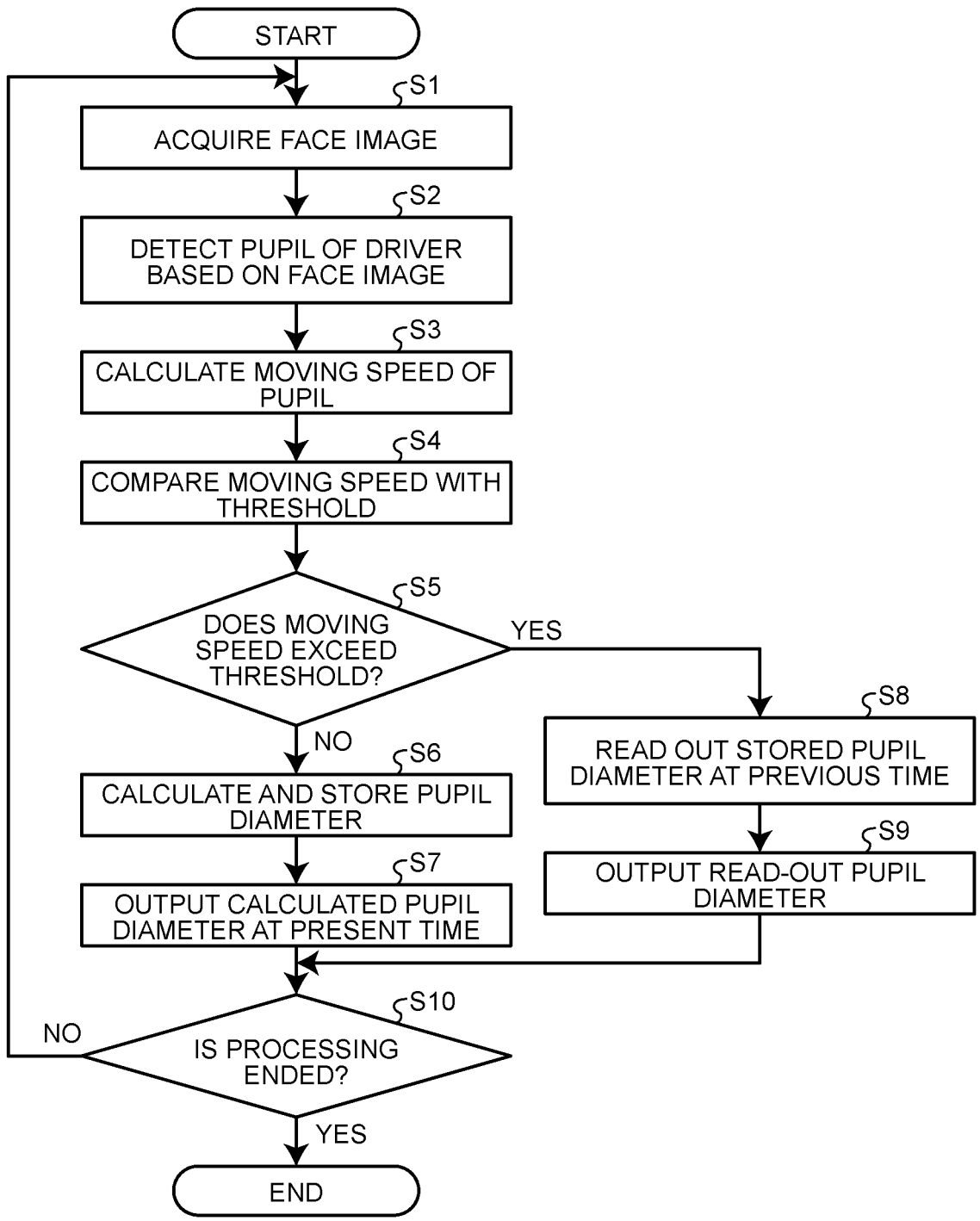
FIG. 3 is a flowchart illustrating a procedure of adjusting brightness of a virtual image performed by the display device for a vehicle according to the embodiment.

Next, the following describes a procedure of brightness adjustment control for the virtual image S performed by the display device 1 for a vehicle with reference to the flowchart illustrated in FIG. 3. The display device 1 for a vehicle is started in a case in which an accessory (ACC) power source or an ignition (IG) power source of the vehicle 100 is turned ON, and repeatedly performs processing described below until these power source is turned OFF.

At Step S1, the camera 3 for a driver acquires the face image to be output to the pupil diameter output unit 7.

Next, at Step S2, the pupil detection unit 10 detects the pupil E of the driver D based on the face image input from the camera 3 for a driver.

Next, at Step S3, the moving speed calculation unit 11 calculates the moving speed of the pupil E based on the position of the pupil E of the driver D detected by the pupil detection unit 10.

Next, at Step S4, the pupil diameter calculation unit 12 reads out the threshold (for example, 0.2 [m/s]) from the nonvolatile memory, and compares the threshold with the moving speed of the pupil E calculated by the moving speed calculation unit 11.

Next, at Step S5, the pupil diameter calculation unit 12 compares the moving speed M of the pupil E with the threshold, and determines whether the moving speed M of the pupil E exceeds the threshold. As a result of this determination, in a case in which the moving speed M of the pupil E exceeds the threshold, the process proceeds to Step S8. On the other hand, in a case in which the moving speed M of the pupil E does not exceed the threshold, that is, in a case in which the moving speed M of the pupil E is equal to or lower than the threshold, the process proceeds to Step S6.

Next, at Step S6, the pupil diameter calculation unit 12 calculates the pupil diameter of the pupil E based on the pupil E detected by the pupil detection unit 10 at Step S2, and temporarily stores the calculated pupil diameter in the nonvolatile memory.

Next, at Step S7, the pupil diameter calculation unit 12 outputs the pupil diameter at the present time calculated at Step S6 to the brightness adjustment unit 15, and advances the process to Step S10.

On the other hand, at Step S8, the pupil diameter calculation unit 12 reads out the pupil diameter at the previous time stored in the nonvolatile memory.

Next, at Step S9, the pupil diameter calculation unit 12 outputs the read-out pupil diameter to the brightness adjustment unit 15, and advances the process to Step S10.

At Step S10, the pupil diameter output unit 7 determines whether to end this processing. In a case in which this processing is not ended, the process returns to Step S1.

Through the processing described above, in a case in which the moving speed M of the pupil E is equal to or lower than the threshold, the brightness adjustment unit 15 adjusts the brightness of the virtual image S using the pupil diameter at the present time that is calculated based on the pupil E at the present time. On the other hand, in a case in which the moving speed M of the pupil E exceeds the threshold, the brightness adjustment unit 15 adjusts the brightness of the virtual image S using the pupil diameter at the previous time without using the pupil diameter at the present time based on the pupil E at the present time. Due to this, in a case in which the moving speed M of the pupil E exceeds the threshold and it is estimated that the pupil E is not correctly detected, the display device 1 for a vehicle can adjusts the brightness of the virtual image S using the pupil diameter at the time when the moving speed M does not exceed the threshold.

As described above, the display device 1 for a vehicle according to the present embodiment includes the moving speed calculation unit 11 that calculates the moving speed M of the pupil E based on the position of the pupil E detected by the pupil detection unit 10. In a case in which the moving speed M of the pupil E is equal to or lower than the threshold, the pupil diameter calculation unit 12 calculates the pupil diameter at the present time based on the pupil E at the present time, and outputs the calculated pupil diameter at the present time to the brightness adjustment unit 15. On the other hand, in a case in which the moving speed M of the pupil E exceeds the threshold, the pupil diameter calculation unit 12 outputs the pupil diameter calculated at the previous time to the brightness adjustment unit 15 as the pupil diameter at the present time.

With the configuration described above, in a case in which there is the possibility that the driver D vibrates due to traveling of the vehicle 100 on a rough road and the pupil E of the driver D cannot be correctly detected, the display device 1 for a vehicle uses the pupil diameter calculated at the previous time as the pupil diameter at the present time to adjust the brightness of the virtual image S. As a result, the brightness of the virtual image S to be displayed can be adjusted with high accuracy, and visibility of the virtual image S for the driver D can be improved.

In the display device 1 for a vehicle according to the present embodiment, the brightness adjustment unit 15 adjusts the brightness of the virtual image S based on the illuminance detected by the illuminance sensor 2 and the pupil diameter output from the pupil diameter output unit 7. Due to this, the display device 1 for a vehicle can adjust the brightness of the virtual image S while considering brightness of a vehicle environment, and can improve visibility of the virtual image S for the driver D as compared with a case in which the illuminance is not detected.

In the embodiment described above, the brightness adjustment unit 15 adjusts the brightness of the virtual image S based on two parameters including the illuminance detected by the illuminance sensor 2 and the pupil diameter output from the pupil diameter output unit 7, but the embodiment is not limited thereto. For example, the brightness adjustment unit 15 may adjust the brightness of the virtual image S based on only the pupil diameter output from the pupil diameter output unit 7. Alternatively, the brightness adjustment unit 15 may adjust the brightness of the virtual image S based on only the illuminance detected by the illuminance sensor 2 as needed.

In the embodiment described above, in a case in which the moving speed M exceeds the threshold, the pupil diameter output unit 7 outputs the pupil diameter that is calculated at the previous time and stored in the nonvolatile memory to the brightness adjustment unit 15 without calculating the pupil diameter of the pupil E, but the embodiment is not limited thereto. For example, the pupil diameter output unit 7 may be configured to perform map control based on a detection result of the illuminance sensor 2 in a case in which the moving speed M exceeds the threshold, and output a pupil diameter prepared in advance. In this case, the pupil diameter output unit 7 holds pupil diameters of the pupil E of the driver D corresponding to respective values of the illuminance as a map, and reads out, from the map, and outputs the pupil diameter corresponding to the detected illuminance in a case in which the moving speed M exceeds the threshold.

In the embodiment described above, the display device 1 for a vehicle is started when the ACC power source and the like of the vehicle 100 is turned ON as described above, and repeatedly performs the processing illustrated in FIG. 3 until the power source is turned OFF. The pupil diameter calculation unit 12 outputs the pupil diameter calculated at the previous time to the brightness adjustment unit 15 as the pupil diameter at the present time in a case in which the moving speed M exceeds the threshold. However, in an initial state, there is a case in which the pupil diameter calculated at the previous time is not present even if the moving speed M exceeds the threshold. In this case, for example, the pupil diameter calculation unit 12 may be configured to use a fixed value set in advance until the pupil diameter is properly calculated. Alternatively, the brightness adjustment unit 15 may be configured not to adjust the brightness of the virtual image S until the pupil diameter is properly calculated.

In the embodiment described above, the illuminance sensor 2 is dedicated to the display device 1 for a vehicle, but the embodiment is not limited thereto. An illuminance sensor provided for automatic lighting of a headlight of the vehicle 100 may be diverted to the illuminance sensor 2.

In the embodiment described above, the camera 3 for a driver is disposed on the steering column, but the embodiment is not limited thereto. The camera 3 for a driver may also be disposed on an instrument panel, a dashboard, a room mirror, or the like.

In the embodiment described above, the display device 6 includes the three reflective mirrors 5A to 5C, but the number thereof is not limited thereto.

In the embodiment described above, the display device 1 for a vehicle is applied to the vehicle 100 such as an automobile, but the embodiment is not limited thereto. The display device 1 for a vehicle may also be applied to a ship, an aircraft, or the like other than the vehicle, for example.

The display device for a vehicle according to the present embodiment exhibits an effect of adjusting the brightness of the virtual image to be displayed with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, the display device comprising:
   an image display unit that projects a display image on a projected member of a vehicle, and causes a driver of the vehicle to visually recognize a virtual image corresponding to the display image projected on the projected member;
   an imaging unit that acquires a face image including a face of the driver;
   a pupil detection unit that detects a pupil of the driver based on the face image acquired by the imaging unit;
   a moving speed calculation unit that calculates a moving speed of the pupil based on a position of the pupil detected by the pupil detection unit;
   a pupil diameter calculation unit that calculates a pupil diameter of the pupil based on the pupil detected by the pupil detection unit; and
   an adjustment unit that adjusts brightness of the virtual image based on at least the pupil diameter, wherein
   the pupil diameter calculation unit
      outputs the pupil diameter to the adjustment unit based on a comparison result between the moving speed calculated by the moving speed calculation unit and a threshold,
      calculates the pupil diameter at a present time based on the pupil at the present time detected by the pupil detection unit in a case in which the moving speed is equal to or lower than the threshold, and outputs the calculated pupil diameter at the present time to the adjustment units, and
      outputs the pupil diameter calculated at a previous time to the adjustment unit as the pupil diameter at the present time in a case in which the moving speed exceeds the threshold.

2. The display device for a vehicle according to claim 1, the display device further comprising:
   an illuminance detection unit that detects illuminance of the vehicle, wherein
   the adjustment unit adjusts brightness of the virtual image based on illuminance detected by the illuminance detection unit and the pupil diameter.

* * * * *